Aug. 3, 1943.  R. E. WILSON  2,325,823
DETACHABLE FILM LOADING GUIDE FOR DEVELOPING TANK REELS
Filed Dec. 16, 1942  2 Sheets-Sheet 2

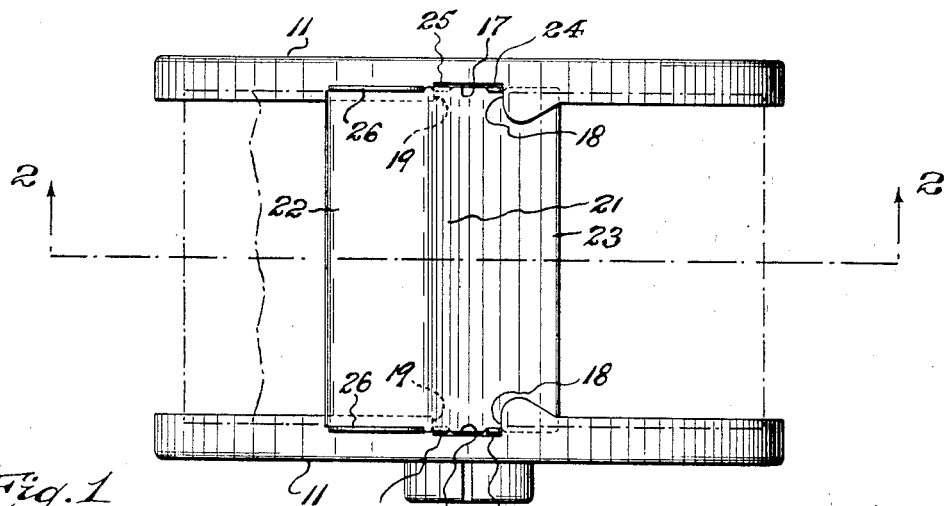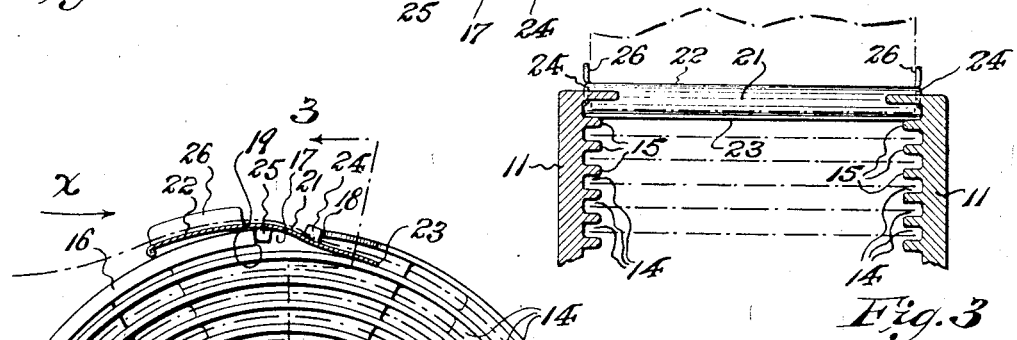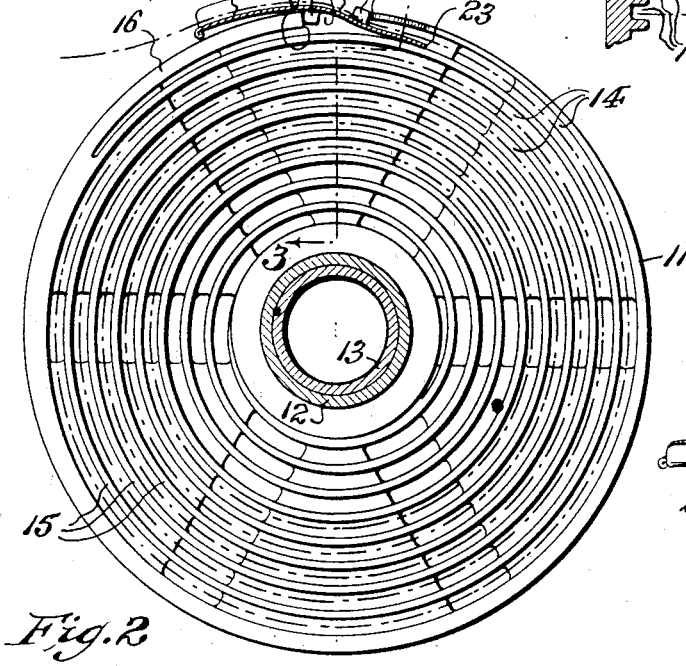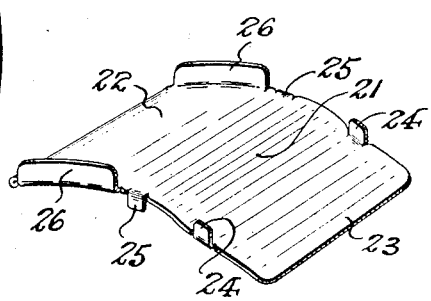
Aug. 3, 1943. R. E. WILSON 2,325,823
DETACHABLE FILM LOADING GUIDE FOR DEVELOPING TANK REELS
Filed Dec. 16, 1942 2 Sheets-Sheet 1
Fig. 1
Fig. 2
Fig. 3
Fig. 4
INVENTOR.
Robert E. Wilson,
BY George D. Richards
ATTORNEY.

INVENTOR.
Robert E. Wilson,
BY George D. Richards
ATTORNEY

Patented Aug. 3, 1943

2,325,823

UNITED STATES PATENT OFFICE 2,325,823

DETACHABLE FILM LOADING GUIDE FOR DEVELOPING TANK REELS

Robert E. Wilson, Belleville, N. J.

Application December 16, 1942, Serial No. 469,176

6 Claims. (Cl. 242—76)

This invention relates to improvements in detachable film guide means for facilitating the loading of lengths of photographic film into a developing tank reel of the general type and kind shown in United States Patent No. 2,151,907, granted March 28, 1939, to Lawrence R. Fink, which reel comprises a pair of spaced hub supported opposed circular side discs respectively formed on their inner faces with matching helical channels to receive opposite longitudinal marginal portions of a film to be loaded into and coiled therein, and the rims of said side discs having cut out entrance ways leading through the peripheries of the same to the outer open ends of said helical channels.

One common method of loading a reel of the kind referred to, is to thread the leading end of a length of film, to be deposited and coiled therein, through the entrance ways of the disc rims, and thence into the outer open ends of the opposed helical channels, then continuing inward manual pushing of the film longitudinally through said channels until the entire length thereof is deposited and coiled within the reel interior Since such loading operation must be carried on in a dark room, or under absence of light conditions, difficulty is experienced both in entering the film and in maintaining alignment thereof with the reel discs and their channels in order to attain smooth and even movement of the film into the reel, without producing injurious distortion of the film, or scratching or otherwise injuring or smearing the film surfaces, and especially the sensitized or emulsion coated face of the film.

Having these things in view, it is an object of this invention to provide a novel, simple, easily and quickly attachable film guide means adapted to be mounted on the reel periphery for extension through the side disc entrance ways and into the outer open ends of the helical film receiving channels of said side discs, said guide means including means to engage the reel side discs, when applied thereto as stated, in such manner as to efficiently and securely hold said guide means against longitudinal shifting displacement from its operative attached relation to the reel, especially while passing a film thereover and into said reel; and said guide means being further provided with means to abut the longitudinal edges of a film passed thereover, so as to hold said film running longitudinally straight and true as it is manually pushed into and through the reel side disc channels for coiled deposit therein; all to the end that reel loading manipulation of a film, with a minimum of handling and with substantially no risk of injurious distortion, scratching or other injury thereto, may be quickly and easily attained, practically by sense of touch alone, either in total darkness or in the modified light of a dark room.

Other objects of this invention, not at this time more particularly enumerated, will be understood from the following detailed description of the same.

Illustrative embodiments of this invention are shown in the accompanying drawings, in which:

Fig. 1 is a peripheral side elevational view of a film developing tank reel having operatively attached thereto one form of the novel film guide means according to this invention, the course of an applied film over said guide means and into the reel interior being indicated by broken dot and dash lines; Fig. 2 is a transverse vertical sectional view of the same, taken on line 2—2 in Fig. 1; Fig. 3 is a fragmentary axial cross-sectional view, taken on line 3—3 in Fig. 2; and Fig. 4 is a perspective view of said film guide means detached from the reel.

Similar characters of reference are employed in the above described views, to indicate corresponding parts.

Figure 5:
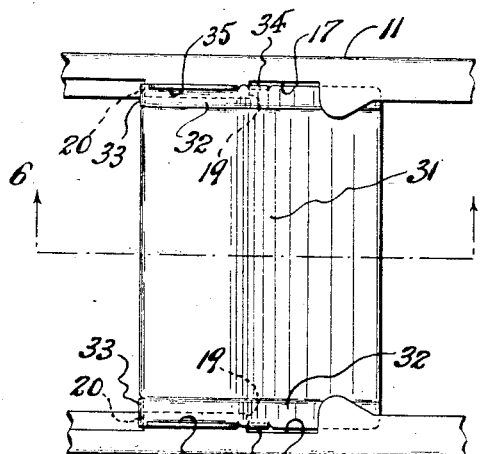
Fig. 5 is a fragmentary peripheral side elevational view of a film developing tank reel having operatively attached thereto a modified form of film guide means according to this invention.

As shown in the drawings, the developing tank reel, with which the film guide device of this invention is designed to be used, comprises a pair of laterally spaced and opposed circular side discs 11, respectively provided with central hub portions 12 and 13 telescopically engaged in such manner that said side discs may be adjustably spaced to fit and receive various widths of film strips. Formed in the inner faces of said side discs 11 are helical channels 14, defined by bounding flanges 15. Said channels are adapted to receive and support the longitudinal margins of a film strip, when the latter is passed between the side discs, whereby to form the film strip into a coil within the reel interior, the convolutions of the coil being spaced apart so that the film strip surfaces are properly exposed for contact by a developing fluid, when the reel is deposited in a developing tank containing said fluid. The reel side discs 11 are provided with peripheral rim portions 16, adjacent to which the outer open ends of the helical channels 14 terminate, and said rim portions are cut away or notched at points contiguous to said open ends of the helical channels 14, whereby to provide entrance ways 17 leading through the reel rims to said outer open ends of the helical channels 14.

The novel film guide device, in one form thereof as shown in Figs. 1 to 4 inclusive of the accompanying drawings, comprises a guide plate 21 of longitudinal shallow reversely curved plane, whereby to provide an exterior rearward receiving end portion 22, and a downwardly offset interior forward discharge end portion 23, when operatively mounted on the reel. The guide plate 21 is sized in width to accommodate a film strip of selected given width, to which film strip width the reel side discs are spacedly adjusted. Being thus properly sized in width, to operatively mount the guide device on the reel, the interior forward end portion 23 of the guide plate 21 is passed inwardly through the reel rim entrance ways 17 so as to enter its side marginal portions within the outer open ends of the reel side disc channels 14, and in supported engagement upon the lower or inner bounding flanges 15 thereof, thus being disposed to bridge across and between said reel side discs. When the guide plate 21 is thus related to the reel side discs, its exterior rearward end portion 22 will rest upon the rims or external peripheries of the side discs, and so as to likewise bridge across and between the same.

Means are provided to hold the thus applied guide plate 21 against longitudinal shifting displacement, especially while manually sliding and passing a film strip thereover and into the reel side disc film coiling and supporting channels 14. One means to this end comprises a pair of upwardly projecting stop elements or lugs 24, respectively extending from the guide plate side margins, whereby to abut the shoulders 18 provided by the forward ends of the reel rim entrance ways 17, thus preventing forward or inward longitudinal shift or displacement of the guide plate, and a pair of downwardly projecting stop elements or lugs 25, respectively extending from the guide plate side margins, whereby to abut the shoulders 19 provided by the rearward ends of said reel rim entrance ways 17, and thus preventing rearward or outward longitudinal shift or displacement of said guide plate.

Means are provided for guiding a film strip when manually propelled over the guide plate, whereby to hold said film strip running straight and true in properly aligned relation to the side disc channels 14. This means comprises upstanding guide walls 26 extending from the side margins of the interior receiving end portion 22 of the guide plate 21, the same being adapted to guidingly engage the longitudinal edges of the film strip when the latter is propelled over and along the face of said guide plate 21.

From the above it will be obvious that a very simple and quickly attachable and detachable film guide device is provided, the same comprising a unitary, one-piece construction adapted to be either produced by stamping the same from sheet metal, or by molding it from plastic material, or made from other suitable material by any convenient production method. The application of the guide device to the reel may be carried out entirely by the sense of touch, and consequently the same is very suitable and convenient for use in dark room or under total absence of light conditions.

In use of the guide device, when operatively attached to the reel, the leading end of a film strip is merely laid upon the top surface thereof between the guide walls 26 and pushed forward in the direction of arrow $x$ in Fig. 2, and downwardly over said surface, until said leading end passes through the reel entrance ways 17 and thence into the outwardly open ends of the reel channels 14, whereupon by continued forward longitudinal manual propulsion of the film strip, the same is entirely entered and coiled within the reel interior.

Figure 6:
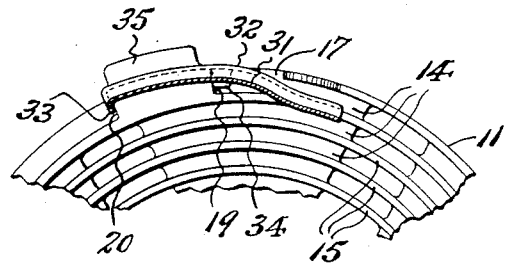
Fig. 6 is a fragmentary transverse vertical sectional view of the same, taken on line 6—6 in Fig. 5.
Figure 7:
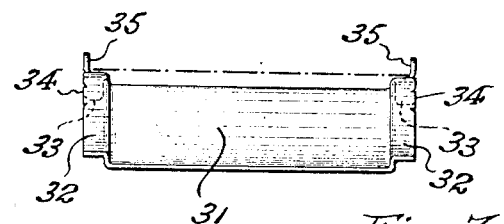
Fig. 7 is a discharge end elevational view of said modified film guide means detached from the reel.

In Figs. 5 to 7 of the drawings is shown a somewhat modified form of the guide device according to this invention, and one adapted to engage reel rims shaped as shown in Figs. 5 and 6, wherein said rims are cut back rearwardly of the entrance ways 17 to provide shoulders 20 (this being a well-known commercial reel design). The modified guide device comprises a guide plate of longitudinal shallow reversely curved plane, of continuous character as shown in Figs. 1 to 4 inclusive, or, shaped, as shown in Figs. 5 to 7, to provide a depressed or countersunk medial portion 31 bordered by relatively raised side marginal ledges 32, which pass through the reel entrance ways 17 so that their exterior end portions rest on the reel rim peripheries and their interior end portions rest on bounding flanges 15 of the channels 14, within the outer open ends of the latter. The advantage of the latter form is that the film strip moved over the guide plate is only in contact therewith at its longitudinal side marginal portions, and consequently, the major portion of the emulsion coated face of the film strip, which is usually opposed to the guide device, is supported free from sliding contact with the latter. This countersunk formation of the guide plate may be utilized in the first described construction shown in Figs. 1 to 4 if desired.

In the form of guide device shown in Figs. 5 to 7, the stop elements for prevention of longitudinal shift or displacement of the guide device, when operatively mounted on the reel, are somewhat differently arranged and formed, and comprise a pair of down-turned stop elements or lugs 33, respectively extending from the rearward edge of the device, whereby to abut the shoulders 20 of the reel rims, thus preventing forward or inward longitudinal shift or displacement of the guide device. Angularly extended from the side margins of the device, are a pair of downwardly projecting stop elements or lugs 34 disposed to abut the shoulders 19 of the reel entrance ways 17, and thus preventing rearward or outward longitudinal shift or displacement of the guide device. The exterior rear end portion of the guide device is provided, in extension from its lateral margins, with upstanding guide walls 35, to engage side edges of a film strip, and thereby hold the film strip running straight and true in properly aligned relation to the reel channels 14, when said strip is propelled over the guide device.

Figure 8:
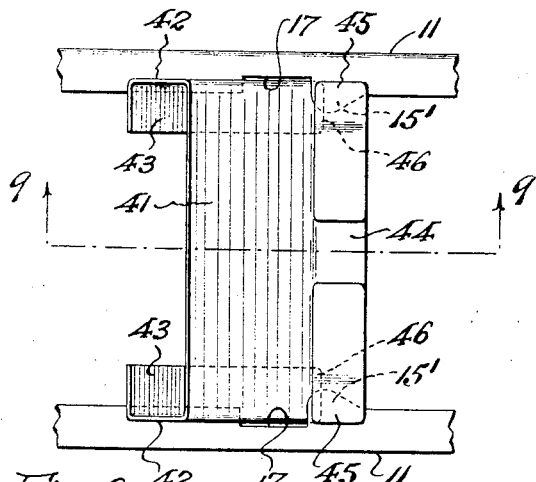
Fig. 8 is a fragmentary peripheral side elevational view of a film developing tank reel having attached thereto another form of film guide means according to this invention.
Figure 9:
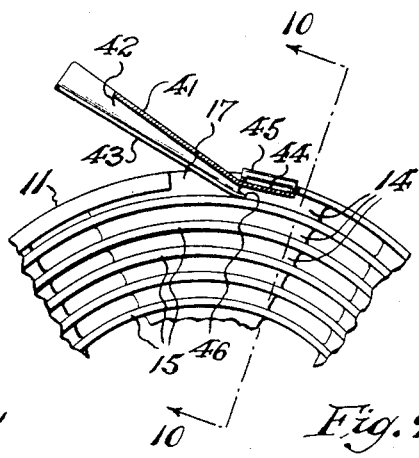
Fig. 9 is a fragmentary transverse vertical sectional view of the same, taken on line 9—9 in Fig. 8.
Figure 10:
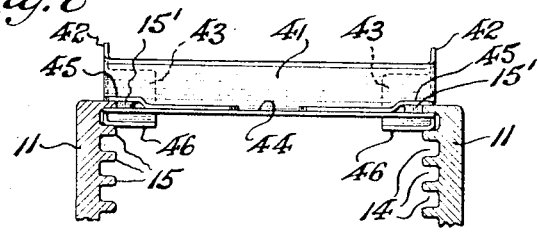
Fig. 10 is a fragmentary axial cross-sectional view, taken on line 10—10 in Fig. 9.

In Figs. 8 to 10 of the drawings is shown another modified form of film strip guide device adapted to be detachably mounted on the reel to extend through the entrance ways 17 and into the outer open ends of the reel channels 14. This form of the device comprises an inclined guide plate 41 provided with lateral side flanges 42 dependent from opposite longitudinal edge portions thereof, said side flanges having inwardly projecting film strip supporting ledge members 43 extending from its lower free edges. Said guide plate 41 is provided at its inner end portion with an angular extension 44, to which are affixed oppositely directed clip lugs 45, the free end portions of which are spaced from the plane of said extension. This form of the guide device is attached to the reel by embracing the reel disc rim ends 15', which are contiguous to the outer open ends of the reel channels 14 and to the rim entrance ways 17, between the extension 44 and the clip lugs 45 of said guide device. When the guide device is thus attached to the reel, the inner ends 46 of the ledge members 43 will enter the outer open ends of the reel channels 14. The spacing of the side flanges 42 approximates the width of a film strip to be guided, and consequently when such film strip is passed beneath the plate 41 and over the ledge members 43, the same will be caused to run straight and true for entrance and passage through the open ends of the reel channels 14 so as to be coiled up within the reel interior.

Having now described my invention, I claim:

1. A detachable loading guide for a film strip developing reel, the latter being formed by spaced side discs provided with peripheral entrance ways leading to the outwardly open ends of their helical film receiving and coiling channels, comprising a guide member for bridging disposition between the reel side discs and adapted to enter through said entrance ways and into the outwardly open ends of the channels thereof, said guide member having opposed side wall portions to engage longitudinal edges of a film strip passed therealong, whereby to hold said strip aligned with said reel channels for movement through outwardly open ends thereof and thereinto, and said guide member having means cooperative with the reel disc rims for holding the guide member against displacement therefrom while manually propelling a film strip along said guide member and into said reel channels.

2. A detachable loading guide for a film strip developing reel, the latter being formed by spaced side discs provided with peripheral entrance ways leading to the outwardly open ends of their helical film receiving and coiling channels, comprising a guide plate for bridging disposition between the reel side discs, said guide plate being of substantially inclined plane to pass through said reel disc entrance ways so as to provide a film strip receiving end portion disposed exteriorly of the reel disc peripheries and an interior strip discharge end portion entered in the outwardly open ends of the reel disc channels, said guide plate having angular wall portions along side marginal portions thereof adapted to engage longitudinal edges of a film strip passed therealong, whereby to hold said strip aligned with said reel disc channels for straight and true movement thereinto, and said guide plate having means cooperative with the reel disc rims for holding the guide plate against displacement from operative mounted relation to the reel.

3. A detachable loading guide for a film strip developing reel, the latter being formed by spaced side discs provided with peripheral entrance ways leading to the outwardly open ends of their helical film receiving and coiling channels, comprising a guide plate for bridging disposition between the reel side discs, said guide plate being of longitudinal reversely curved plane adapted to pass through said reel disc entrance ways, thus providing an outer end portion disposed exteriorly of the reel disc peripheries and an inner end portion entering the outwardly open ends of the reel disc channels, said guide plate having upstanding film strip guide walls along the side margins of its outer end portion, and said guide plate having stop means engageable with reel rim portions, whereby to hold said guide plate against longitudinal shifting displacement when a film strip is manually propelled thereover and into said reel channels.

4. A detachable loading guide for a film strip developing reel, the latter being formed by spaced side discs provided with peripheral entrance ways leading to the outwardly open ends of their helical film receiving and coiling channels, comprising a guide plate for bridging disposition between the reel side discs, said guide plate being of longitudinal reversely curved plane adapted to pass through said reel disc entrance ways, thus providing an outer end portion disposed exteriorly of the reel disc peripheries and an inner end portion entering the outwardly open ends of the reel disc channels, said guide plate having upstanding film strip guide walls along the side margins of its outer end portion, said guide plate having stop means engageable with reel rim portions, whereby to hold said guide plate against longitudinal shifting displacement when a film strip is manually propelled thereover and into said reel channels, and the medial longitudinal portion of said guide plate being depressed to form relatively raised marginal film strip supporting ledges adjacent the sides thereof.

5. A detachable loading guide for a film strip developing reel, the latter being formed by spaced side discs provided with peripheral entrance ways leading to the outwardly open ends of their helical film receiving and coiling channels, comprising a guide plate for bridging disposition between the reel side discs, said guide plate being of longitudinal reversely curved plane adapted to pass through said reel disc entrance ways, thus providing an outer end portion disposed exteriorly of the reel disc peripheries and an inner end portion entering the outwardly open ends of the reel disc channels, said guide plate having upstanding film strip guide walls along the side margins of its outer end portion, a pair of stop lugs upwardly projecting from opposite side margins of said guide plate to engage forward sides of the reel disc entrance ways, and a pair of stop lugs downwardly projecting from opposite side margins of said guide plate to engage rearward sides of the reel disc entrance ways, said stop lugs being adapted to hold the guide plate against longitudinal shifting displacement when a film strip is manually propelled thereover and into said reel channels.

6. A detachable loading guide for a film strip developing reel, the latter being formed by spaced side discs provided with peripheral entrance ways leading to the outwardly open ends of their helical film receiving and coiling channels, comprising a guide plate for bridging disposition between the reel side discs, said guide plate being of longitudinal reversely curved plane adapted to pass through said reel disc entrance ways, thus providing an outer end portion disposed exteriorly of the reel disc peripheries and an inner end portion entering the outwardly open ends of the reel disc channels, said guide plate having upstanding film strip guide walls along the side margins of its outer end portion, a pair of stop lugs upwardly projecting from opposite side margins of said guide plate to engage forward sides of the reel disc entrance ways, a pair of stop lugs downwardly projecting from opposite side margins of said guide plate to engage rearward sides of the reel disc entrance ways, said stop lugs being adapted to hold the guide plate against longitudinal shifting displacement when a film strip is manually propelled thereover and into said reel channels, and the medial longitudinal portion of said guide plate being depressed to form relatively raised marginal film strip supporting ledges adjacent the sides thereof.

ROBERT E. WILSON.